(12) United States Patent
Pauls et al.

(10) Patent No.: US 11,175,675 B2
(45) Date of Patent: Nov. 16, 2021

(54) CONTROL UNIT, METHOD, AND SENSOR SYSTEM FOR SELF-MONITORED LOCALIZATION

(71) Applicant: Robert Bosch GmbH, Stuttgart (DE)

(72) Inventors: Jan-Hendrik Pauls, Grossbottwar (DE); Tobias Strauss, Obersulm (DE); Carsten Hasberg, Ilsfeld-Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 16/654,775

(22) Filed: Oct. 16, 2019

(65) Prior Publication Data
US 2020/0133296 A1    Apr. 30, 2020

(30) Foreign Application Priority Data
Oct. 29, 2018   (DE) .......................... 102018218492.5

(51) Int. Cl.
*G05D 1/02*    (2020.01)

(52) U.S. Cl.
CPC ......... *G05D 1/0246* (2013.01); *G05D 1/0274* (2013.01); *G05D 1/0257* (2013.01); *G05D 2201/0212* (2013.01); *G05D 2201/0213* (2013.01)

(58) Field of Classification Search
CPC .. G05D 1/0246; G05D 1/0274; G05D 1/0257; G05D 2201/0212; G05D 2201/0213; B60W 2050/021; B60W 2050/0215; B60W 2556/50; B60W 50/0205; B60W 50/0098; G01C 21/3848; G01C 25/00; G01S 17/86; G01S 7/4972; G01S 7/4004
See application file for complete search history.

(56) References Cited

U.S. PATENT DOCUMENTS

| | | | |
|---|---|---|---|
| 10,209,081 B2 * | 2/2019 | Ghadiok | G01C 21/3602 |
| 10,467,771 B2 * | 11/2019 | Stenborg | G06K 9/00208 |
| 10,598,494 B2 * | 3/2020 | Catherall | G01C 21/165 |
| 2006/0146136 A1 * | 7/2006 | Cho | G01C 21/165 |
| | | | 348/207.1 |
| 2008/0059068 A1 * | 3/2008 | Strelow | G05D 1/0246 |
| | | | 701/469 |
| 2009/0228204 A1 * | 9/2009 | Zavoli | G01S 19/49 |
| | | | 701/532 |
| 2012/0116676 A1 * | 5/2012 | Basnayake | G01C 21/30 |
| | | | 701/469 |

(Continued)

FOREIGN PATENT DOCUMENTS

| | | |
|---|---|---|
| DE | 102014014295 A1 | 3/2016 |
| DE | 102015205088 A1 | 9/2016 |

*Primary Examiner* — Thomas Ingram
(74) *Attorney, Agent, or Firm* — Norton Rose Fulbright US LLP; Gerard Messina

(57) ABSTRACT

A control unit for a vehicle for analyzing localization systems, the control unit being connectable in a data-conducting manner to at least two localization systems which are operable independently of one another for ascertaining system-specific positions, each localization system including at least one sensor, the control unit being configured to evaluate pieces of position information ascertained by the localization systems by subjecting them to a plausibility check. Also described are a related method and a sensor system.

21 Claims, 4 Drawing Sheets

(56) References Cited

U.S. PATENT DOCUMENTS

| | | | |
|---|---|---|---|
| 2012/0135745 A1* | 5/2012 | Kaplan | G09B 29/004 |
| | | | 455/456.1 |
| 2015/0212522 A1* | 7/2015 | Webber | G01C 21/20 |
| | | | 701/50 |
| 2017/0074659 A1* | 3/2017 | Giurgiu | G01S 19/41 |
| 2018/0045519 A1* | 2/2018 | Ghadiok | G06K 9/2054 |
| 2019/0155827 A1* | 5/2019 | Giurgiu | H04L 67/12 |

\* cited by examiner

CONTROL UNIT, METHOD, AND SENSOR SYSTEM FOR SELF-MONITORED LOCALIZATION

RELATED APPLICATION INFORMATION

The present application claims priority to and the benefit of German patent application no. 10 2018 218 492.5, which was filed in Germany on Oct. 29, 2018, the disclosure of which is incorporated herein by reference.

FIELD OF THE INVENTION

The present invention relates to a control unit for a vehicle, to a method for localizing a sensor system, and to a sensor system.

BACKGROUND INFORMATION

With increasing requirements and a progressing degree of automation in the automotive field, sensors are used to an ever greater extent. These requirements are placed, in particular, on automated driving functions, such as highly automated or driverless driving. Since it is never possible to completely preclude failures or malfunctions of the sensors and of the downstream processing system, constant or frequent self-monitoring is necessary, in particular, in the case of driverlessly controlled vehicles.

Driver assistance systems and automatable driving functions are dependent on sensors, which are already calibrated or initially set at the factory. Due to the growing number of sensors, errors may arise during factory processes for the calibration of the sensors. Furthermore, the sensors may deviate from original factory specifications during operation or after delivery of the sensor system or of the vehicle. Such deviations may arise as a result of outside effects or as a result of signs of wear. In particular, sensor defects or maladjustment of sensors which may not be automatically compensated for or be detected during operation are problematic in this regard, since in this way faulty sensor data are used for safety-relevant functions without being noticed.

SUMMARY OF THE INVENTION

An object underlying the present invention is to provide a control unit and a method which enable a reliable operation of multiple localization systems.

This object may be achieved with the aid of the respective subject matter described herein. Advantageous embodiments of the present invention are the subject matter of the respective further descriptions herein.

According to one aspect of the present invention, a control unit for a vehicle for analyzing localization systems is provided, the control unit being connectable in a data-conducting manner to at least two localization systems which are operable independently of one another for ascertaining system-specific positions. The control unit is configured to evaluate pieces of position information ascertained by the localization systems by subjecting them to a plausibility check.

According to a further aspect of the present invention, a method for localizing a sensor system is provided, in particular, of a vehicle by a control unit. In one step, system-specific positions are determined in each case by at least two localization systems by using sensors. The system-specific positions of the different localization systems are compared to one another. In the absence of a predefined agreement of the system-specific positions, a signal is generated. According to one advantageous embodiment, an error analysis may be carried out by the control unit after the signal has been generated.

According to a further aspect of the present invention, a sensor system, in particular, for a vehicle, is provided. The sensor system includes at least two localization systems which are operable independently of one another for ascertaining system-specific positions of the sensor system. Each localization system accesses at least one sensor and the corresponding sensor data, the sensor system including a control unit coupled to the localization systems in a data-conducting manner. The control unit is configured to evaluate pieces of position information ascertained by the localization systems by subjecting them to a plausibility check.

A self-monitoring of existing localization systems may be ensured by the control unit, the sensor system and/or the method, which is able to uncover faulty calibration of the sensors or errors in the use of digital maps.

Although the sensors may be calibrated at the factory or already online, this process is not able to permanently guarantee a successful calibration and functional capability of the sensors. In particular, subsequent environmental conditions may alter the position of the sensors with respect to one another, the so-called extrinsic calibration. Moreover, the used sensors may subsequently change their intrinsic characteristics. Such a change may, for example, be caused by a force action on the sensor.

In addition to GPS sensors, it is also possible to use LIDAR sensors, radar sensors, camera sensors, ultrasonic sensors and the like as sensors. The features identified by the sensors in surroundings of the sensor system may be compared to a digital map and be identified. Based on such a comparison, the position of the sensor system within the map may be ascertained. The different used localization systems may, for example, access sensors of one type and may be operated independently of one another. In this way, a localization system may extract features of the surroundings based on sensor data from camera sensors.

Another localization system may ascertain surroundings features based on sensor data from radar sensors. Such localization systems may utilize the sensor data of identical or different sensors to calculate a position specific to the respective localization system.

The localization systems may be executed in the form of localization algorithms on the control unit or on separate control units and are connected to the sensors in a data-conducting manner directly or by drivers. Furthermore, the localization systems may include one or multiple machine-readable memory/memories on which they are stored and are executable. The memories may also be used as temporary or permanent memories for the sensor data.

The localization systems may be made up of one or multiple localization filter(s), for example Kalman or particle filters, one or multiple localization optimizers, for example graph optimizers, or arbitrary combinations thereof. In particular, a localization system may determine a position based on features from surroundings with high certainty, and thus in a converged manner.

The position may be ascertained with high certainty by a localization system when the sensors have low noise, the used maps are precise and still up-to-date, the association of surroundings and map features was carried out correctly, and when the optimization of the features with respect to one another or to the position of the sensor system relative to these was successful.

If one of the described items is not carried out correctly or is carried out with insufficient accuracy, a position is determined with low certainty and is thus non-convergent.

The control unit is able to receive the position data ascertained by the localization systems and to evaluate them by subjecting them to a plausibility check. During the evaluation by subjection to a plausibility check by the control unit, the respective position data may be evaluated and/or compared to one another. In this way, only position data ascertained by the localization systems which were logically and/or correctly ascertained by the localization systems are utilized for further use. In this way, it is possible to optimally link different independent position data with one another or process them. Illogical position data may be precluded from the use by the control unit.

For example, an approach for a localization which optimally explains the position data may be calculated by the control unit. Such an approach may, for example, include an area which was determined from the known position data using the least squares method. All position data outside the area may be ignored. In particular, outliers may be identified by the evaluation with subjection to a plausibility check, and may be ignored during the further evaluation by the control unit.

According to one specific embodiment, the control unit is configured to evaluate a convergence behavior of the localization systems for ascertaining the respective system-specific positions, differences in the convergence behavior of the respective localization systems being ascertainable by the control unit.

In particular, the pieces of position information ascertained by the localization systems may be evaluated by subjection to a plausibility check by the evaluation of the convergence behavior of the localization systems.

The specific positions ascertained by the localization systems may form an overlap or intersection as a result of spatial superposition, which is considered to be a convergence of the corresponding localization systems.

In this way, a convergence location which was ascertained by multiple localization systems may be used as an absolute position of the sensor system. In the case of multiple convergence locations, the location which was ascertained based on the most localization systems may be further processed.

Such uncertainties in the determination of the position arise due to sensor defects and sensor noise, for example due to perturbations and weather conditions. Furthermore, faulty individual association and outdated maps lacking surroundings features may result in an uncertain position determination. By analyzing the convergence behavior of the localization systems by the control unit, such uncertainties in the position determination may be checked and identified. In this way, it is also possible to establish errors in the mapping process, such as features incorrectly aligned with one another or so-called alignment errors.

The method may, in particular, be used for a vehicle which is operable in an automated manner and includes corresponding automated driver assistance systems. With the aid of the method, a self-monitored localization, map validation, and sensor check and recalibration may be carried out. In the process, localization systems, for example of a highly automated vehicle, are operated separately from one another to infer the cause of the lacking convergence of the position determination in the case of possible differences in the convergence behavior. In this way, operating multiple localization systems independently of one another may be used to create a redundancy of the position determination. Furthermore, it is possible to compare multiple system-specific positions ascertained by different localization systems to one another to establish faulty localization systems. If, for example, each localization system is independent from the other localization systems as a result of the used features and/or sensors and the respective combination thereof, a cause for the lacking convergence may be determined from the differences in the convergence behavior. In the case of a plurality of localization systems, this may be detected, for example, based on a deviation from a majority position determination.

The localization systems each separately ascertain system-specific positions of the sensor system, which, at best, may agree with or deviate from one another. In this way, the absolute ascertained position of the sensor system may be considered as an average of multiple system-specific positions. The system-specific positions may deviate slightly from one another in the process, with adherence to tolerances, to nonetheless be classified as agreeing.

The use of different possible combinations of the convergence behavior of localization systems which are independent in terms of the sensors, but overlap with respect to the used map features may enable the following advantageous functions:

detection of sensor failures detection of faulty calibrations and maladjustments detection of map changes.

The localization of the sensor system or of a vehicle may continue to be enabled in this process, despite faulty sensors or evaluations, since the control unit may continue or allow a position determination of the sensor system in the event of a detected discrepancy with one or multiple localization system(s) through weighting and through a comprehensive check and monitoring of the localization systems.

According to one specific embodiment, the system-specific position of the at least one localization system based on sensor data from at least one sensor is ascertained by a comparison to features of a map stored in the control unit or obtained from the control unit. A localization system may utilize one or multiple map feature(s) which a priori are independent, and one or multiple type(s) of sensors which also a priori are independent of one another. Based on the sensors and the map features, it is possible to calculate the position specific to the system relative to the mapped world by detecting, associating and optimizing the surroundings features and map features. In this way, a localization independent from the GPS system may be carried out.

According to one further specific embodiment, sensor defects or faulty calibration is/are establishable by the control unit based on the ascertained differences in the convergence behavior of the localization systems. The respective localization systems may each converge to a specific position. However, one or multiple specific position(s) may deviate from other specific positions. In such a case, the sensor data of the system which has ascertained a deviating position, and thus the at least one used sensor, may be faulty. In this way, an online calibration or a calibration during operation may be carried out.

As an alternative or in addition, a renewed calibration of the corresponding sensors may be carried out in a workshop. As long as a majority of the localization systems of different sensors converge on a shared location, this position may still be utilized as a usable position of the sensor system or of a vehicle including a sensor system.

According to one further specific embodiment, errors of the map are establishable by the control unit based on ascertained differences in the convergence behavior of the localization systems. In this way, certain map features, such as roadway markings, signage and the like, may be used for position determination. In the case of an error in the map, a localization system using certain map features may converge to a deviating location than the remaining localization systems which use deviating map features. Such a behavior indicates a change in the actual surroundings relative to the map or map features aligned in a faulty manner with respect to one another during the map creation. For example, new roadway markings may be plotted, which are slightly shifted. Alignment errors in the map may be caused by algorithmic errors or by calibration errors during the map creation, for example.

According to one further specific embodiment, the measuring data are from different sensors operable independently of one another. In this way, the localization systems may be operated redundantly, errors being isolated and limited to individual localization systems.

According to one further specific embodiment, at least one system-specific position is determined by comparing and identifying features of a digital map. In this way, a localization may be provided which is independent from GPS sensors and thus reliably operable in a precise manner even in heavily built-up areas.

According to one further specific embodiment, the system-specific positions of different localization systems are compared to one another, taking tolerances into consideration. In this way, the respective positions established by the localization systems may have minor deviations to compensate for systematic deviations and basic noise of the sensors.

According to one further specific embodiment, it is checked based on the error analysis whether one or multiple sensor(s) of a localization system is/are maladjusted or has/have a sensor defect. In this way, a self-check of the sensor system may be provided. If discrepancies are established by the control unit, countermeasures, such as online calibration or the transfer into a safe state, may be carried out. Furthermore, the localization of the sensor system based on results of localization systems may be continued when the control unit verifies the correctness of the results.

According to one further embodiment, it is checked based on the error analysis whether a map error is present. Highly precise maps represent an essential prerequisite for safe automated driving and a part of highly developed assistance systems. Here, the functions also require the position of the vehicle relative to the map. The more features of the real world are stored in a map, however, the more easily the map may become outdated since each of the individual features may change over time. When assistance systems and systems for automated driving utilize pieces of map information, the up-to-dateness of the map must first be ensured. Errors which are attributable to maps no longer being up to date may be uncovered by the method. Such errors may arise when a localization system is based on certain feature types, such as roadway markings, and the corresponding calculated position deviates from other localization systems.

The system-specific positions may be relative or absolute positions. For example, the positions may have distances from adjoining objects and features, or objects and features situated in the scanning area.

According to one further exemplary embodiment, a position of the sensor system is determined based on a multitude of system-specific positions which essentially agree with one another. In this way, the function may be continued, despite established errors in a localization system, since the source of errors may be extracted by the error analysis of the control unit. For example, with a majority of localization systems utilizing different features of the map, a position may be ascertained when the ascertained positions agree and are plausible, apart from a faulty localization system.

According to one further exemplary embodiment, at least one localization system is used to eliminate ambiguities or errors of a further localization system. In this way, a redundant operating mode of the localization systems may take place, which ensures the position determination even if errors, ambiguities or maladjustments are established.

According to one further exemplary embodiment, a weighting in the ascertainment of the system-specific position of a localization system is influenced by the control unit. Depending on the configuration of the localization system, for example in the case of a localization optimizer, the weighting or the error may be adapted on the individual maps of a graph optimizer. Furthermore, with a localization filter, the individual filter terms may be evaluated and analyzed in the case of a Gaussian mixture filter, or the individual particles may be evaluated and analyzed in the case of a particle filter. By evaluating the different convergence behaviors, it is possible for the control unit to decide which localization filters or parts of the localization filters are actually used for the localization, evaluated and/or combined.

Exemplary embodiments of the present invention are described in greater detail hereafter based on highly simplified schematic representations.

DETAILED DESCRIPTION

Figure 1:
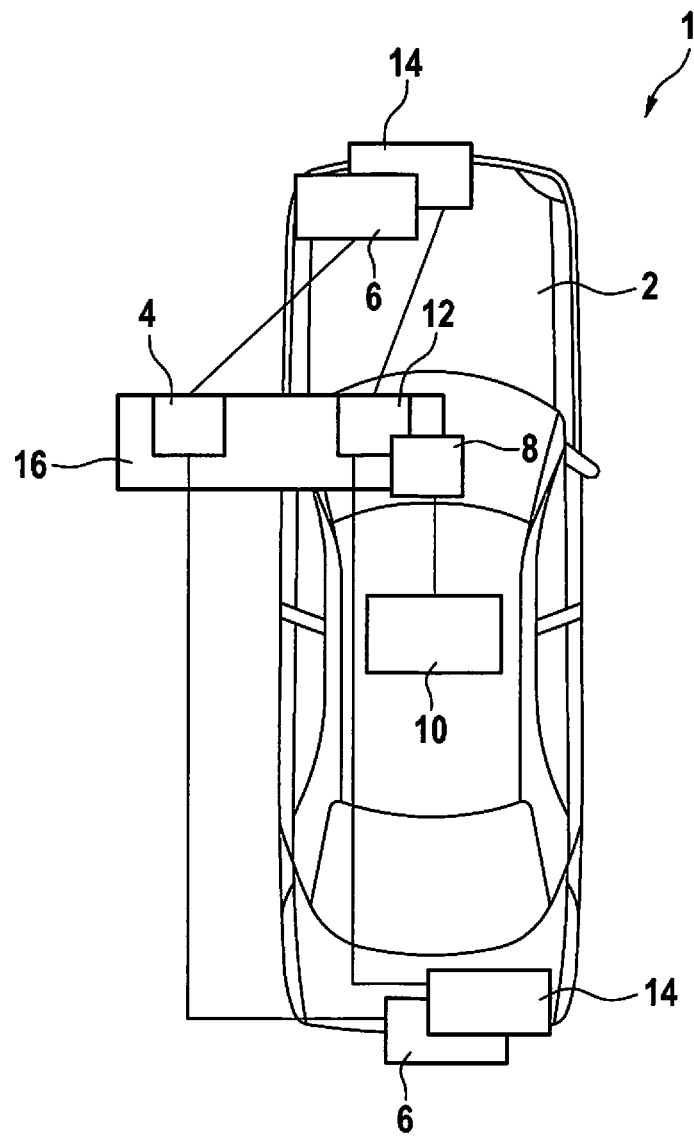
FIG. 1 shows a schematic top view onto a sensor system in a vehicle according to one specific embodiment of the present invention.

FIG. 1 shows a top view onto a sensor system 1 which is installed in a vehicle 2.

Sensor system 1 includes a first localization system 4, which uses two camera sensors 6 for a system-specific position determination, a second localization system 8, which is based on a LIDAR sensor 10, and a third localization system 12, which uses two radar sensors 14. Camera sensors 6 and radar sensors 14 are each situated on a vehicle front and on a vehicle rear here. LIDAR sensor 10 is positioned on a vehicle roof.

According to the exemplary embodiment, localization systems 4, 8, 12 are implemented as integral components of a control unit 16. However, localization systems 4, 8, 12 may also be configured as separate or independent software or hardware modules.

The respective localization systems 4, 8, 12 may ascertain relative or absolute system-specific positions of vehicle 2 by evaluating sensors 6, 10, 14. Localization systems 4, 8, 12 operate independently of one another and have access to different types of sensors 6, 10, 14.

Control unit 16 is configured to evaluate localization systems 4, 8, 12 and to compare, in particular, the positions of vehicle 2 or of sensor system 1 ascertained by localization systems 4, 8, 12 to one another. Furthermore, control unit 16 is used to merge localization systems 4, 8, 12 or the positions ascertained by localization systems 4, 8, 12 with one another.

FIGS. 2 through 7 show schematic representations of scenarios of sensor system 1 on a four-lane roadway 18 for illustrating a method according to the present invention. System-specific positions P1, P2, P3 determined by localization systems 4, 8, 12 are represented as planar areas which map an uncertainty of the respective localization. Furthermore, one or multiple overlapping areas X, X1, X2 is/are illustrated, which are formed by intersections of positions P1, P2, P3, and thus form the positions in which the respective localization systems 4, 8, 12 converge. The respective positions P1, P2, P3 are determined, for example, relative to roadway boundaries 20 or to roadway markings 22 by localization systems 4, 8, 12.

Figure 2:
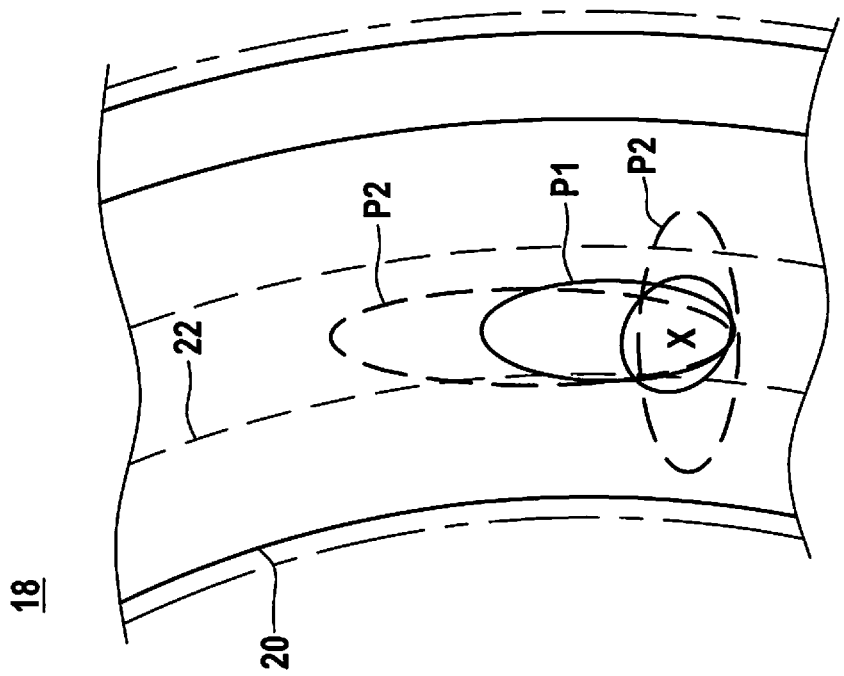
FIG. 2 shows a schematic representation of a scenario of the sensor system for illustrating a method according to the present invention.

In FIG. 2, all localization systems 4, 8, 12 converge to a shared location X. Sensor system 1 has an unrestricted functionality, so that position X may be used for automated driving, for example.

Figure 3:
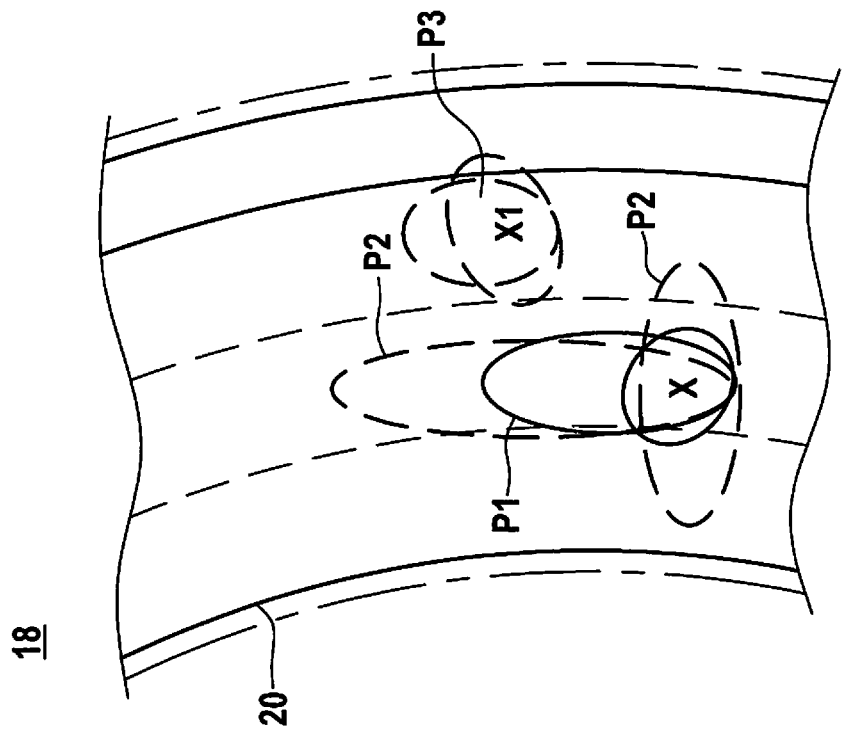
FIG. 3 shows a schematic representation of another scenario of the sensor system for illustrating a method according to the present invention.

FIG. 3 shows another scenario in which localization system 12, which uses radar sensors 14, converge to a deviating location X1. Specific position P3 ascertained by third localization system 12 does not agree with specific positions P1, P2 of first and second localization systems 4, 8, which converge in a shared location X. Such a scenario arises, in particular, when radar sensors 14 are maladjusted relative to the other sensors 6, 10. Control unit 16 may carry out an online calibration in the process, or request a workshop visit. In the workshop, radar sensors 14 may be calibrated again.

As long as a majority of localization systems 4, 8 of different sensors 6, 10 converge on a shared location X, this location may still be output as a usable position of vehicle 2.

Figure 4:
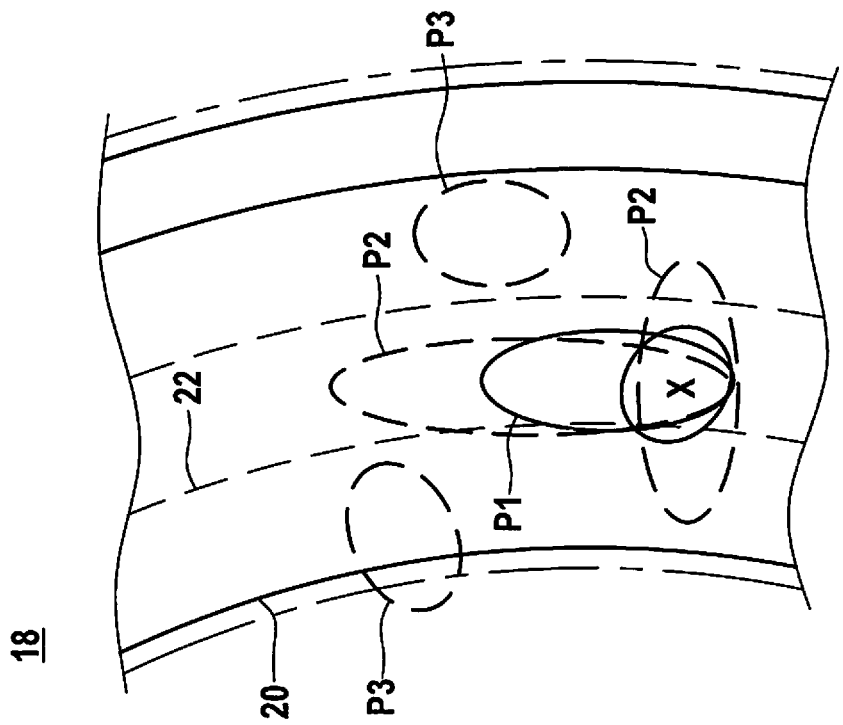
FIG. 4 shows a schematic representation of another scenario of the sensor system for illustrating a method according to the present invention.

FIG. 4 shows another case in which positions P2 ascertained based on radar sensors 14 do not converge in one location. In this case, control unit 16 may establish a sensor defect. Here as well, a sensor majority 6, 10 may determine an unambiguous and plausible position, which agrees with position X in FIG. 3.

Figure 5:
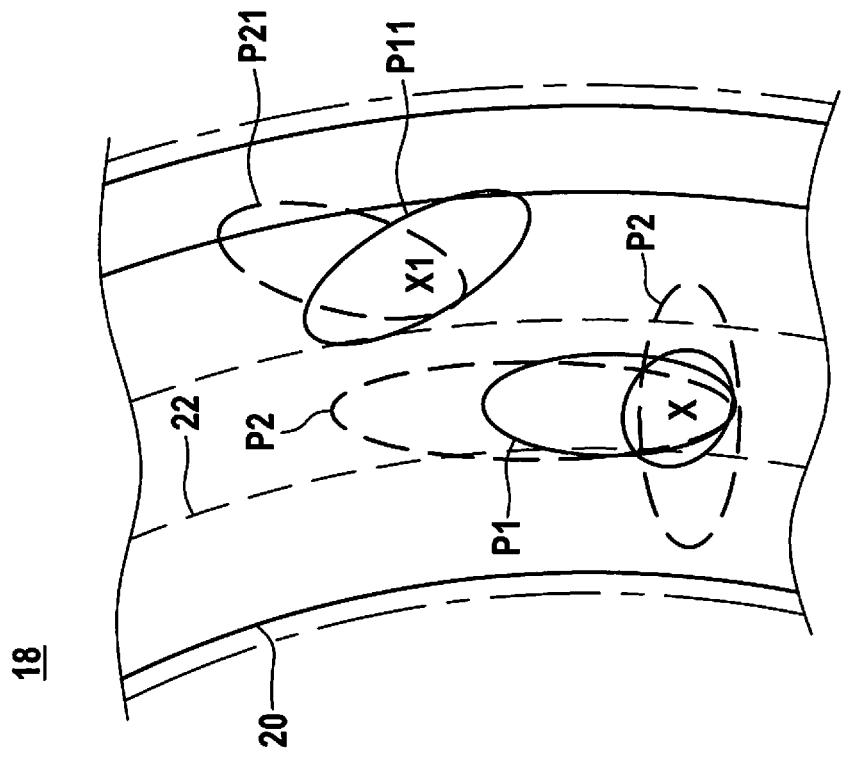
FIG. 5 shows a schematic representation of another scenario of the sensor system for illustrating a method according to the present invention.

FIG. 5 shows positions P1, P2 of localization system 4, 8, which use a roadway marking 22 as a feature. However, these positions P11, P21 converge in a deviating location X1 compared to the remaining ascertained positions P1, P2, deviating map features being used in the process.

This indicates either a change in the actual surroundings 18 compared to a map, or errors which already existed during the map generation.

In this scenario, most system-specific positions P1, P2 are configured in such a way that they converge in a position X, and thus enable a valid position determination. The respective specific positions P1, P11 and P2, P21 were created based on sensor data of camera sensors 6 and of LIDAR sensor 10, the sensor data of one and the same sensor being usable for a feature analysis of different features, whereby one specific position is determined per considered feature. In this way, for example, one or multiple position(s) P2, P21 may be ascertained by second localization system 8 using a LIDAR sensor 10.

Figure 6:
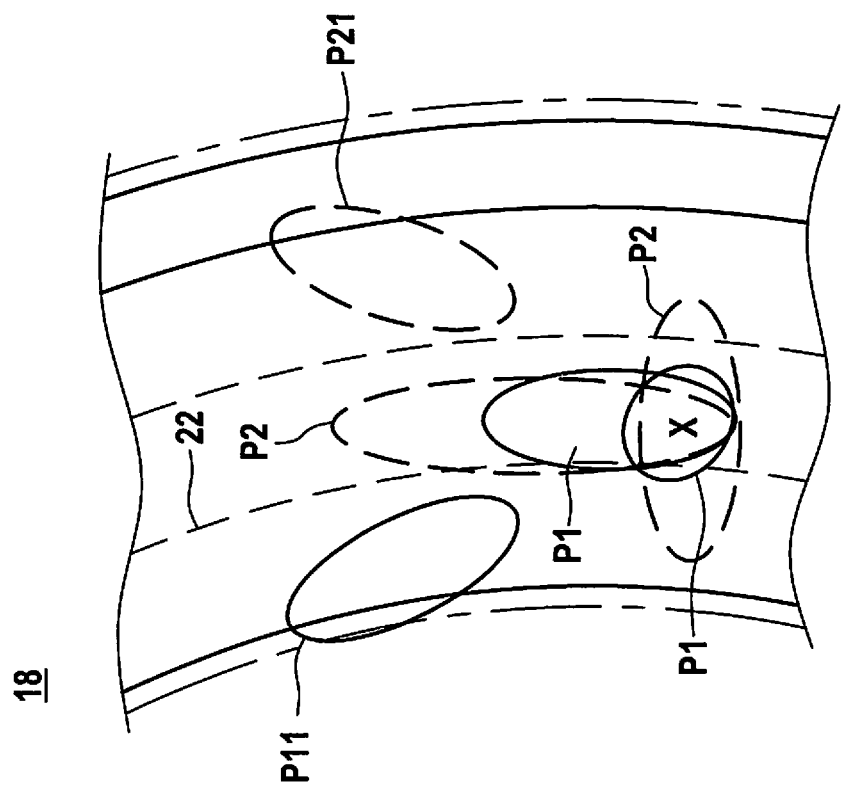
FIG. 6 shows a schematic representation of another scenario of the sensor system for illustrating a method according to the present invention.

FIG. 6 illustrates another scenario in which localization systems 4, 8 use map features which result in positions P11, P21 which do not converge. In this case, either surroundings 18 have changed since the map was created in such a way that the map is no longer able to explain surroundings 18, or errors already arose in the creation of the map, which cause the map to no longer be able to plausibly plot the surroundings. Here as well, a feature majority may still result in a valid position X.

Figure 7:
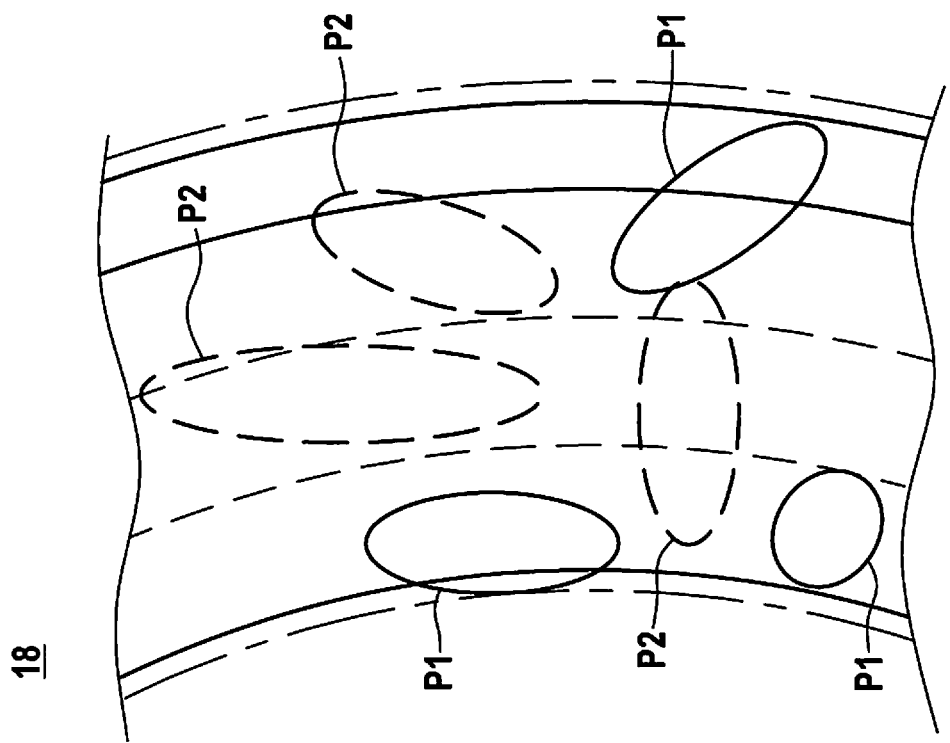
FIG. 7 shows a schematic representation of another scenario of the sensor system for illustrating a method according to the present invention.

FIG. 7 shows a case in which no convergence was able to be ascertained. Positions P1, P2, P3, which were ascertained based on different features by localization systems 4, 8, 12, diverge and/or are not able to agree on one location. In this case, a sensor defect or map error is present.

A distinction between the two error types is not possible in this case. Should a (in this case mixed) majority of localization systems agree on one position, despite divergence and non-agreement, this is usable for localization. According to the exemplary embodiment, there is no position X for a further use, so that the control unit may output an error message and place vehicle 2 in a safe state, unless a driver is controlling vehicle 2. In the case of a manually controllable vehicle 2, control unit 16 may surrender control of the vehicle to the driver.

In the case of periodic signals, such as roadway markings 22, a localization system may converge on more than one location and may thus have ambiguities with respect to the specific position. In such a case, the ambiguity may be resolved by superimposing appropriately suitable other localization systems. For this purpose, for example, the ambiguity of a localization system utilizing roadway markings as features may usually be unambiguously resolved locally by signs in the driving direction and a corresponding localization system utilizing signs as features for localization.

What is claimed is:

1. A control apparatus, for a vehicle, for analyzing localization systems, comprising:
a control unit, wherein:
the control unit is connectable in a data-conducting manner to a plurality of localization systems which are operable independently of one another for ascertaining respective system-specific positions of the vehicle; and
the control unit is configured to:
obtain from each of the plurality of localization systems the respective system-specific position ascertained by the respective localization systems;
determine whether there is a convergence of a majority of the respective system-specific positions obtained from the plurality of localization systems; and
based on the determination, perform at least one of the following:
in response to the determination being that the convergence is present, at least one of:
controlling the vehicle with an automated driving maneuver based on the convergence without regard to one or more of the obtained system-specific positions that are inconsistent with the convergence; and recalibrating one or more of the plurality of localization systems whose respective system-specific position is inconsistent with the convergence; and in response to the determination being that the convergence is not present, discontinuing automated driving of the vehicle.

2. The control unit of claim 1, wherein the respective system-specific position of at least one of the localization systems is based on sensor data from at least one sensor with a comparison to features of a map stored in the control unit or obtained from the control unit.

3. The control unit of claim 1, wherein sensor defects or faulty calibration are establishable by the control unit based on the determination.

4. The control unit of claim 1, wherein errors of the map are establishable by the control unit based on the determination being that a plurality of different convergences are present.

5. The control unit of claim 1, wherein the control unit is configured to, in response to the determination being that the convergence is present, control the vehicle with an automated driving maneuver based on the convergence without regard to one or more of the obtained system-specific positions that are inconsistent with the convergence.

6. The control unit of claim 5, wherein the control unit is configured to, in response to the determination being that the convergence is present, recalibrate one or more of the plurality of localization systems whose respective system-specific position is inconsistent with the convergence.

7. The control unit of claim 6, wherein the control unit is configured to, in response to the determination being that the convergence is not present, discontinue automated driving of the vehicle.

8. The control unit of claim 5, wherein the control unit is configured to, in response to the determination being that the convergence is not present, discontinue automated driving of the vehicle.

9. The control unit of claim 1, wherein the control unit is configured to, in response to the determination being that the convergence is present, recalibrate one or more of the plurality of localization systems whose respective system-specific position is inconsistent with the convergence.

10. The control unit of claim 9, wherein the control unit is configured to, in response to the determination being that the convergence is not present, discontinue automated driving of the vehicle.

11. The control unit of claim 1, wherein the control unit is configured to, in response to the determination being that the convergence is not present, discontinue automated driving of the vehicle.

12. A method for a vehicle comprising:
independently determining respective system-specific positions by a plurality of localization systems by evaluating measuring data from sensors, wherein a control unit is connectable in a data-conducting manner to the plurality of localization systems;
the control unit obtaining the respective system-specific positions from the plurality of localization systems;
the control unit determining whether there is a convergence of a majority of the respective system-specific positions obtained from the plurality of localization systems; and
the control unit performing at least one of the following based on the determination:
in response to the determination being that the convergence is present, at least one of:
controlling the vehicle with an automated driving maneuver based on the convergence without regard to one or more of the obtained system-specific positions that are inconsistent with the convergence; and
recalibrating one or more of the plurality of localization systems whose respective system-specific position is inconsistent with the convergence; and
in response to the determination being that the convergence is not present, discontinuing automated driving of the vehicle.

13. The method of claim 12, further comprising the control unit carrying out an error analysis based on the determination being that the convergence is present and that at least one of the respective system-specific positions is inconsistent with the convergence that has been determined to be present.

14. The method of claim 13, wherein it is checked based on the error analysis whether one or multiple sensors of one or more of the localization systems is/are maladjusted or has/have a sensor defect.

15. The method of claim 13, wherein it is checked based on the error analysis whether a map error is present.

16. The method of claim 12, wherein the plurality of localization systems determine their respective system-specific positions using different sensors than one another.

17. The method of claim 12, wherein at least one of the system-specific positions is determined by comparing and identifying features of a digital map.

18. The method of claim 12, wherein the system-specific positions of different ones of the localization systems are compared to one another, taking tolerances into consideration.

19. The method of claim 12, wherein the convergence is determined to be present based on a multitude of system-specific positions being determined to essentially agree with one another.

20. The method of claim 12, wherein measuring data from at least one of the localization systems are used to eliminate ambiguities or errors of a further one of the localization systems, and/or wherein a weighting in the determination of the system-specific position of one or more of the localization systems is influenced.

21. A sensor system for a vehicle, comprising:
a plurality of localization systems that are operable independently of one another for ascertaining respective system-specific positions of the vehicle, each of the localization systems including a respective at least one sensor; and
a control unit coupled to the plurality of localization systems in a data-conducting manner, wherein the control unit is configured to:
obtain from each of the plurality of localization systems the respective system-specific position ascertained by the respective localization systems;
determine whether there is a convergence of a majority of the respective system-specific positions obtained from the plurality of localization systems; and
based on the determination, perform at least one of the following:
in response to the determination being that the convergence is present, at least one of:
controlling the vehicle with an automated driving maneuver based on the convergence without regard to one or more of the obtained system-specific positions that are inconsistent with the convergence; and recalibrating one or more of the plurality of localization systems whose respective system-specific position is inconsistent with the convergence and in response to the determination being that the convergence is not present, discontinuing automated driving of the vehicle.

\* \* \* \* \*